(12) United States Patent
Zucker et al.

(10) Patent No.: US 10,929,697 B2
(45) Date of Patent: Feb. 23, 2021

(54) IMAGE PROCESSING FOR IDENTIFYING INDIVIDUALS

(71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 134 days.

(21) Appl. No.: 16/174,698

(22) Filed: Oct. 30, 2018

(65) Prior Publication Data

US 2020/0134339 A1 Apr. 30, 2020

(51) Int. Cl.
*G06K 9/00* (2006.01)
*G06K 9/62* (2006.01)
*G06T 7/292* (2017.01)
*G06Q 30/06* (2012.01)

(52) U.S. Cl.
CPC ....... *G06K 9/00885* (2013.01); *G06K 9/6256* (2013.01); *G06K 9/6262* (2013.01); *G06Q 30/0633* (2013.01); *G06T 7/292* (2017.01); *G06K 2209/27* (2013.01); *G06T 2207/20021* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

2015/0019391 A1* 1/2015 Kumar ................. G06Q 10/087 705/28
2019/0043003 A1* 2/2019 Fisher ................ G06K 9/00335

* cited by examiner

*Primary Examiner* — Vikkram Bali
(74) *Attorney, Agent, or Firm* — Schwegman, Lundberg & Woessner (57) ABSTRACT

Cameras capture time-stamped images of predefined areas. At least one image includes a representation of a portion of an individual with other portions of the individual occluded within the image. Pixel attributes for the portion of the individual are identified and provided as a box or set of coordinates for tracking the individual within the image and in subsequent images taken.

20 Claims, 4 Drawing Sheets

IMAGE PROCESSING FOR IDENTIFYING INDIVIDUALS

BACKGROUND

Current people detection models have difficulty detecting individual people in frames of the images taken. Cameras that capture frames are often placed overhead such that the angle captured in the images is from a top-down perspective. Moreover, the images taken from a top-down perspective often have further occlusions, such as a shelf blocking a clear view of an individual or other individuals captured in the image that partially block the target individual being tracked.

Existing techniques uses sliding windows that search each frame for a single individual that is to be tracked; attempting to find one person at a time in each of the frames. This is a time consuming and processor intensive process and is often inaccurate because when a lower or upper portion of an individual's body is cut off or blocked by other objects or other individuals being tracked.

In fact, detecting an individual in a single image captured in a live retail environment is extremely challenging and existing solutions are infeasible and not viable.

SUMMARY

In various embodiments, methods and a system for image processing to detect individuals are presented.

According to an embodiment, a method for image processing to detect individuals is presented. An image is received, the image depicts a portion of an individual with other portions of the individual occluded within the image. Pixel attributes associated with the portion are identified and other pixel attributes of the image are ignored. Metadata is provided that uniquely identifies the portion within the image based on the identification or the pixel attributes.

DETAILED DESCRIPTION

Figure 1:
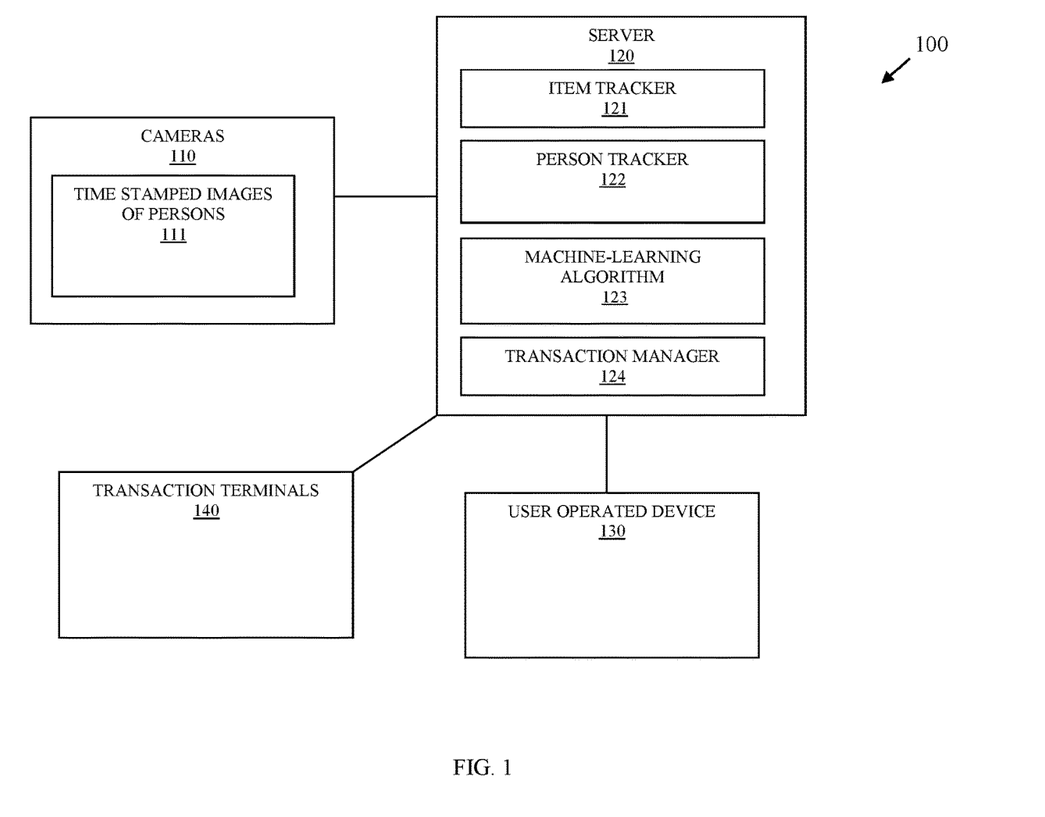
FIG. 1 is a diagram of a system for image processing to detect individuals, according to an example embodiment.

FIG. 1 is a diagram of a system 100 for image processing to detect individuals, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image processing to detect individuals, presented herein and below.

As used herein and below, the terms "customer," "consumer," "shopper," and "user" may be used interchangeably and synonymously.

The system 100 includes a plurality of cameras 110 that capture time-stamped images of persons and groups of persons (herein after just "defined area images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, a trained machine-learning algorithm 123, and a transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the machine-learning algorithm 123. In an embodiment, some of the images when streamed from the cameras 110 can be buffered or cached in memory of cache and made accessible from the memory or cache to the item tracker 121, the person tracker 122, and the machine-learning algorithm 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

Some frames of the images may not include clear pixel data for a person (individual) that is being tracked by the person tracker 122. That is, pixel data assigned to the individual may be missing in varying degrees because pixel data for a different individual or a structure within the store (such as a shelf) may pollute the image frames making it difficult for the person tracker 122 to clearly identify a person being tracked in the frames. This can be a significant issue in a frictionless store implementation because items may be picked up in the frames by the person being tracked, which means that such items may not be accounted for or may be assigned or tracked with another person that is being tracked within the frictionless store.

In these situations, where the frames for the images are occluded in some manner and the person tracker 122 is unable to discern the person being tracked. The occluded frames are passed to a trained machine-learning algorithm 123.

The trained machine-learning algorithm 123 is trained on frames of occluded pixels of individuals being tracked. That is, the individual for each frame, during a training session, is known and is provided to the trained machine-learning algorithm 123. This permits the trained machine-learning algorithm 123 to adjust factors and weights for pixel values and develop a robust algorithm, which when provided with an unknown individual in an occluded frame can make a prediction with a confidence value assigned to it as to a known person that is being actively tracked.

In an embodiment, the trained machine-learning algorithm 123 is trained on images of individuals using frames of images provided by cameras 110 at high angles, overhead focused downward on the heads of the individuals, and at low angles focused upward from the feet or legs of the individuals.

The machine-learning algorithm 123 is configured to divide an image frame received into grid cells and evaluate each grid cell for pixel data known (trained on) to be associated with a person or attributes of a person. Each grid cell is assigned a confidence value, the grid cells that exceed a predefined threshold for a confidence value are then combined into one box of set of grid cells that identify within the frame the person present in the frame. Distinguishing between those grid cells that include person attributes from non-person attributes allows for proper item assignment to the person within the frame and subsequent frames.

In an embodiment, the machine-learning algorithm 123 divides a single frame for the images received into 160 grid cells as a 13 (vertical) by 13 (horizontal) array. All the grid cells that include a person class (a person's pixel attributes) and that exceed the pre-defined confidence threshold value are retained within the array for the frame. The remaining grid cells form a box to track for the person. As more frames come in for the person, a plurality of overlapping boxes are formed for the person being tracked, and the overlapping boxes can be tracked as a single combined box by the person tracker 122 for proper item assignment (discussed below).

The output from the trained machine-learning algorithm 123 is then a box representing a smaller number of grid cells from the original frame provided as input to the machine-learning algorithm 123. The reduced in size frame includes just those pixel values and corresponding grid cells that exceed a predefined level of confidence by the machine-learning algorithm 123. The box provides an anchor to the person tracker 122 for subsequent frames taken for the person being tracked, which allows the person tracker to quickly identify the person in subsequent frames taken of the individual.

The person tracker 122 uses this box in cooperation with the item tracker 121 to determine when a person within the store has picked up an item or removed an item from possession of the person while in the store.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

The person tracker 122 is aware that specific tracked persons are supposed to be present in the frames but is unable to accurately identify each of the individual persons. In such situations, the person tracker 122 passes the image frame to the machine-learning algorithm 123 along with each individual person's bounding box attributes. A bounding box with x (horizontal) and y (vertical) coordinate positions for each tracked person is maintained by the person tracker 122. In occluded frames, the machine-learning algorithm 123 returns the anchor box for the tracked person, providing adjusted coordinates for those frames.

This permits the item tracker 121 to properly associate any item taken by a person in the image 111 to be assigned to the proper person being tracked by the person tracker 122. The association of possessed items along with the specific person is then processed to notify the transaction manager 124. The transaction manager 124 maintains a shopping cart for each person (known identity or unknown identity). The transaction manager 124 is notified when items are to be added or removed from a particular person's shopping cart.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person, the person can check out at a transaction terminal 140; the transaction manager 124 interacts with an agent process on the transaction terminal 140 and provides the shopping cart items for payment when the person tracker 122 identifies the person as being present at the transaction terminal 140. When the person (identified or unidentified) has a mobile application downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

In an embodiment, the machine-learning algorithm 123 also is trained to detect the pose (posture, angle of posture, etc.) and limbs (hand, arm, foot) of each person present in an occluded image 111.

The machine-learning algorithm 123 provides a fine-grain analysis of an image 111 where there person tracker 122 is expecting a person to be present in that image 111 and is unable to ascertain such person from the pixel data of the image 111. The machine-learning algorithm 123 is a machine-learning trained application that returns a reduced sized frame that includes grid cells with a high-degree of confidence representing the person's attributes as a box. This allows for distinguishing the individual within an occluded image 111 and substantially improves frictionless store applications and/or security-based applications. Furthermore, this allows for reduced pixel data being processed by the person tracker 122 and improves processor throughput and memory size (management) in the server 120.

In an embodiment, the transaction terminal 140 is one or more of: A Point-Of-Sale (POS) terminal and a Self-Service Terminal (SST).

In an embodiment, the user-operated device 130 is one or more of: a phone, a tablet, a laptop, and a wearable processing device.

These embodiments and other embodiments are now discussed with reference to the FIGS. 2-4.

Figure 2:
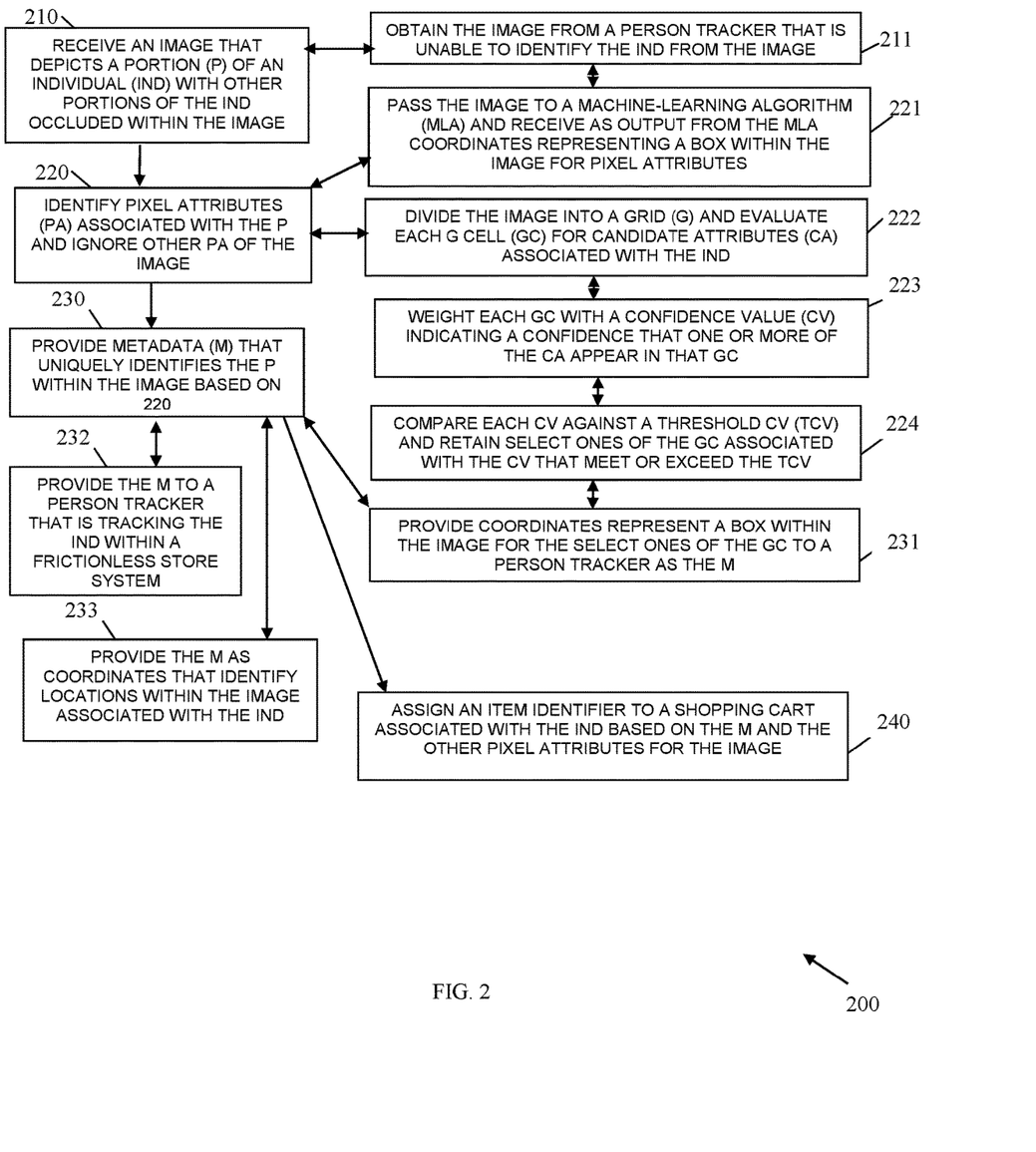
FIG. 2 is a diagram of a method for image processing to detect individuals, according to an example embodiment.

FIG. 2 is a diagram of a method 200 for image processing to detect an individuals in an occluded image frame, according to an example embodiment. The software module(s) that implements the method 200 is referred to as an "individual recognizer." The individual recognizer is implemented as executable instructions programmed and residing within memory and/or a non-transitory computer-readable (processor-readable) storage medium and executed by one or more processors of a device. The processor(s) of the device that executes the individual recognizer are specifically configured and programmed to process the individual recognizer. The individual recognizer has access to one or more network connections during its processing. The network connections can be wired, wireless, or a combination of wired and wireless.

In an embodiment, the device that executes the individual recognizer is the server 120. In an embodiment, the server 120 is a cloud-based server.

In an embodiment, the individual recognizer is all or some combination of: the item tracker 121, the person tracker 122, and the machine-learning algorithm 123.

At 210, the individual recognizer receive an image that depicts a portion of an individual with other portions of the individual being occluded within the image. That is, the pixels of the image include values representing the individual and other pixel values that cover and block some or a substantial amount of the individual.

In an embodiment, at 211, the individual recognizer obtains the image from a person tracker that is unable to identify the individual from the image. In an embodiment, the person tracker is the person tracker 122.

At 220, the individual recognizer identifies pixel attributes associated with the portion of the image and ignores other pixel attributes of the image that are not associated with the individual.

In an embodiment of 211 and 220, at 221, the individual recognizer passes the image to a machine-learning algorithm. In response to the image passed as input to the machine-learning algorithm, the individual recognizer receives as output from the machine-learning algorithm coordinates representing a box within the image for locating and readily identifying the pixel attributes for the individual. In an embodiment, the machine-learning algorithm is the machine-learning algorithm 123.

In an embodiment, at 222, the individual recognizer divides the image into a grid of grid cells. The individual recognizer evaluates each grid cell for candidate attributes associated with the individual or associated with a class of individuals as a whole.

In an embodiment of 222, at 223, the individual recognizer weights each grid cell with a confidence value indicated a confidence that one or more of the candidate attributes appear in that grid cell.

In an embodiment of 223, at 224, the individual recognizer compares each confidence value against a threshold confidence value and the individual recognizer retains select ones of the grid cells associated with the confidence values that meet or exceed the threshold confidence value.

At 230, the individual recognizer provides metadata that uniquely identifies the portion of the image that identifies the individual within the image based on the processing at 220.

In an embodiment of 224 and 230, at 231, the individual recognizer provides coordinates that represent a box within the image for the select ones of the grid cells to a person tracker as the metadata. In an embodiment, the person tracker is the person tracker 122.

In an embodiment, at 232, the individual recognizer provides the metadata to a person tracker that is tracking the individual within a frictionless store system. In an embodiment, the frictionless store system is the system 100.

In an embodiment, at 233, the individual recognizer provides the metadata as coordinates that identifies or encloses locations within the image that are associated with the individual.

According to an embodiment, at 240, the individual recognizer assigns an item identifier to a shopping cart associated with the individual based on the metadata and the other pixel data attributes for the image. That is, an item tracker 121 identifies an item within the image picked up and provides the item identifier to the individual recognizer. The individual recognizer provides the item identifier and a person identifier for the individual to a transaction manager 124, which maintains the shopping cart based on the person identifier.

Figure 3:
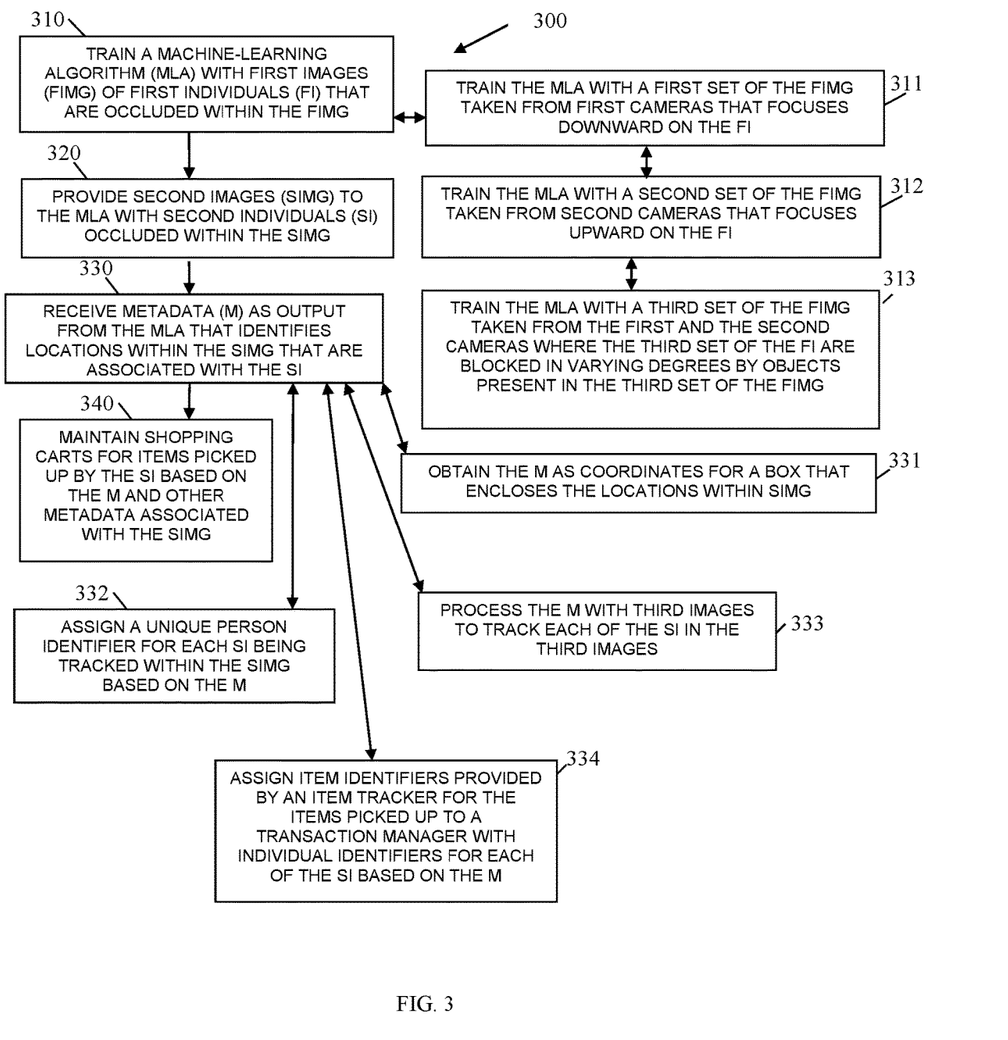
FIG. 3 is a diagram of another method for image processing to detect individuals, according to an example embodiment.

FIG. 3 is a diagram of another method 300 for image processing to detect an individual in an occluded image frame, according to an example embodiment. The software module(s) that implements the method 300 is referred to as a "person detector." The person detector is implemented as executable instructions programmed and residing within memory and/or a non-transitory computer-readable (processor-readable) storage medium and executed by one or more processors of a device. The processors that execute the person detector are specifically configured and programmed to process the person detector. The person detector has access to one or more network connections during its processing. The network connections can be wired, wireless, or a combination of wired and wireless.

In an embodiment, the device that executes the person detector is the server 120. In an embodiment, the server 120 is a cloud processing environment.

In an embodiment, the person detector is all of or some combination of: the item tracker 121, the person tracker 122, the machine-learning algorithm 123, and/or the method 200.

The person detector presents another and in some ways enhanced processing perspective of the method 200 discussed above.

At 310, the person detector trains a machine-learning algorithm with first images of first individuals that are occluded within the first images. In an embodiment, the machine-learning algorithm is the machine-learning algorithm 123.

In an embodiment, at 311, the person detector trains the machine-learning algorithm with a first set of the first images taken from first cameras that are focused downward on the first individuals (directed down towards the heads of the first individuals).

In an embodiment of 311, at 312, the person detector trains the machine-learning algorithm with a second set of the first images taken from second cameras that focuses upward on the first individuals (directed upward from the feet or legs of the first individuals).

In an embodiment of 312, at 313, the person detector trains the machine-learning algorithm with a third set of images of the first images taken from the first and second cameras or third cameras, where a first set of the first individuals are blocked in varying degrees by object present in the third set of first images.

At 320, the person detector provides second images to the machine-learning algorithm with second individuals occluded within the second images.

At 330, the person detector receives metadata as output from the machine-learning algorithm that identifies locations within the second images that are associated with the second individuals.

In an embodiment, at 331, the person detector obtains the metadata as coordinates for a box that encloses the locations within the second images.

In an embodiment, at 332, the person detector assigns a unique person identifier for each second individual being tracked within the second images based on the metadata.

In an embodiment, at 333, the person detector processes the metadata with third images to track each of the second individuals in the third images.

In an embodiment, at 334, the person detector assigns item identifiers provided an item tracker for the items picked up to a transaction manager with individual identifiers for each of the second individuals based on the metadata. In an embodiment, the item tracker is the item tracker 121. In an embodiment, the transaction manager is the transaction manager 122.

According to an embodiment, at 340, the person detector maintains shopping carts for items picked up by the second individuals based on the metadata and other metadata associated with the second images.

Figure 4:
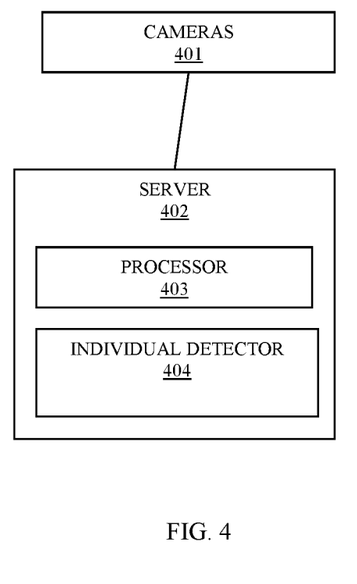
FIG. 4 is a diagram of a system for image processing to detect individuals, according to an example embodiment.

FIG. 4 is a diagram of a system 400 for image processing to detect an individual in an occluded frame image, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as an individual detector 404.

The individual detector 404 when executed from the non-transitory computer-readable storage medium on the processor 403 is configured to: track individuals identified in images; provide occluded images to a machine-learning algorithm that is trained on identifying persons in the occluded images; receive metadata as output from the machine-learning algorithm that specifies locations for the individuals within the occluded images; process the metadata to track the individuals in the occluded images; and interact with an item identifier and a transaction manager to track items picked up by the individuals and to assign item identifiers for the items to shopping carts maintained by transaction manager for each of the individuals based on the images and the occluded images In an embodiment, the item tracker is the item tracker 121.

In an embodiment, the transaction manager is the transaction manager 124.

In an embodiment, the machine-learning algorithm is the machine-learning algorithm 124.

In an embodiment, the individual detector 404 is further configured to process the metadata as coordinates representing boxes within the occluded images for the individuals.

In an embodiment, the individual detector 404 is all or some combination of: the item tracker 121, the person tracker 122, the machine-learning algorithm 123, the transaction manager 124, the method 200, and/or the method 300.

In an embodiment, the system 100 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving an image that depicts a portion of an individual with other portions of the individual occluded within the image;
identifying pixel attributes associated with the portion and ignoring other pixel attributes of the image;
generating individual attributes for the individual from the pixel attributes;
generating metadata as the pixel attributes and the individual attributes;
providing the metadata for uniquely identifying the portion within the image based on the identifying and the generating of the individual attributes;
reducing subsequent pixel data needed for tracking the individual from subsequent images of the individual by processing the metadata with the subsequent images; and
updating the individual attributes within the metadata as the subsequent pixel data is processed based on the other portions of the individual appearing without occlusion in the subsequent pixel data processed with the subsequent images.

2. The method of claim 1, wherein receiving further includes obtaining the image from a person tracker that is unable to identify the individual from the image.

3. The method of claim 2, wherein identifying further includes passing the image to a machine-learning algorithm and receiving as output from the machine-learning algorithm coordinates representing a box within the image for the pixel attributes.

4. The method of claim 1, wherein generating the individual attributes further includes dividing the image into a grids and evaluating each grid cell for the individual attributes associated with the individual.

5. The method of claim 4, wherein dividing further includes weighting each grid cell with a confidence value indicating a confidence that one or more of the individual attributes appear in that grid cell.

6. The method of claim 5; wherein weighting further includes comparing each confidence value against a threshold confidence value and retaining corresponding grid cells associated with the confidence values that meet or exceed the threshold confidence value.

7. The method of claim 6, wherein comparing further includes providing coordinates representing a box within the image for the particular grid cells to a person tracker as the metadata.

8. The method of claim 1, wherein providing further includes providing the metadata to a person tracker that is tracking the individual within a frictionless store system.

9. The method of claim 1, wherein providing further includes providing a first portion of the metadata as coordinates that identify locations within the image associated with the individual.

10. The method of claim 1 further comprising, assigning an item identifier to a shopping cart associated with the individual based on the metadata and the other pixel attributes for the image.

11. A method, comprising:
training a machine-learning algorithm with first images of first individuals that are occluded within the first images;
providing second images to the machine-learning algorithm with second individuals that are occluded within the second images;
receiving metadata as output from the machine-learning algorithm that identifies locations within the second images that are associated with the second individuals;
generating second individual attributes from the locations for the second individuals;
updating the metadata with the second individual attributes; and
maintaining shopping carts for items picked up by the second individuals based on the metadata and other metadata associated with the second images by reducing pixel data that has to be processed with the second images using the metadata and updating the second individual attributes within the other metadata based on at least some of the second images providing representations of the second individuals that are without occlusions.

12. The method of claim 11, wherein training further includes training the machine-learning algorithm with a first set of the first images taken from first cameras having a first angle that focuses downward on the first individuals.

13. The method of claim 12, wherein training further includes training the machine-learning algorithm with a second set of the first images taken from second cameras having a second angle that focuses upward on the first individuals.

14. The method of claim 13, wherein training further includes training the machine-learning algorithm with a third set of the first images taken from the first and second cameras where a first set of the first individuals are blocked in varying degrees by objects present in the third set of the first images.

15. The method of claim 11, wherein receiving further includes obtaining a first portion of the metadata as coordinates for boxes that encloses the locations within the second images.

16. The method of claim 11, wherein receiving further includes assigning a unique person identifier for each second individual being tracked within the second images based on the metadata and the other metadata.

17. The method of claim 11, wherein receiving further includes processing the metadata with third images to track each of the second individuals in the third images.

18. The method of claim 11, wherein maintaining further includes assigning item identifiers provided by an item tracker for the items picked up to a transaction manager with individual identifiers for each of the second individuals based on the metadata and the other metadata.

19. A system; comprising:
cameras configured to capture images within a store;
a server that includes a processor;
the processor configured to execute executable instructions from a non-transitory computer-readable storage medium as individual detector;
the individual detector when executed on the processor configured to:
  track individuals identified in images;
  provide occluded images to a machine-learning algorithm that is trained on identifying persons in the occluded images;
  receive metadata as output from the machine-learning algorithm that specifies locations for the individuals within the occluded images;
  generate person attributes for the persons from the locations;
  updating the metadata with the person attributes;
  process the metadata to track the individuals in the occluded images by reducing pixel data that needs to be processed within the images and the occluded images using the metadata and by updating the person attributes within the metadata as the images reveal the individuals without occlusions; and
  interact with an item identifier and a transaction manager to track items picked up by the individuals and to assign item identifiers for the items to shopping carts maintained by transaction manager for each of the individuals based on the images and the occluded images using the metadata.

20. The system of claim 19, wherein the individual detector is further configured to process a first portion of the metadata as coordinates representing boxes within the occluded images for the individuals.

* * * * *